(12) United States Patent
Anzenberg

(10) Patent No.: US 11,710,304 B2
(45) Date of Patent: Jul. 25, 2023

(54) TEXT RECOGNITION FOR A NEURAL NETWORK

(71) Applicant: Bill.com, LLC, San Jose, CA (US)

(72) Inventor: Eitan Anzenberg, Emeryville, CA (US)

(73) Assignee: BILL.COM, LLC, San Jose, CA (US)

( * ) Notice: Subject to any disclaimer, the term of this patent is extended or adjusted under 35 U.S.C. 154(b) by 0 days.

(21) Appl. No.: 17/893,963

(22) Filed: Aug. 23, 2022

(65) Prior Publication Data

US 2022/0406084 A1    Dec. 22, 2022

Related U.S. Application Data

(63) Continuation of application No. 16/882,091, filed on May 22, 2020, now Pat. No. 11,436,851.

(51) Int. Cl.
| | | |
|---|---|---|
| *G06V 10/82* | (2022.01) | |
| *G06N 3/08* | (2023.01) | |
| *G06V 30/414* | (2022.01) | |
| *G06V 30/413* | (2022.01) | |
| *G06V 30/19* | (2022.01) | |
| *G06V 10/44* | (2022.01) | |
| *G06V 30/412* | (2022.01) | |

(52) U.S. Cl.
CPC ............... *G06V 10/82* (2022.01); *G06N 3/08* (2013.01); *G06V 10/454* (2022.01); *G06V 30/19173* (2022.01); *G06V 30/412* (2022.01); *G06V 30/413* (2022.01); *G06V 30/414* (2022.01)

(58) Field of Classification Search
CPC .... G06V 30/10; G06V 30/412; G06V 30/413; G06V 30/414; G06N 3/08
USPC ......................................................... 382/176
See application file for complete search history.

(56) References Cited

U.S. PATENT DOCUMENTS

| | | |
|---|---|---|
| 2019/0180154 A1 | 6/2019 | Orlov et al. |
| 2019/0385054 A1 | 12/2019 | Zuev et al. |
| 2020/0151443 A1 | 5/2020 | Florencio et al. |
| 2020/0160050 A1 | 5/2020 | Bhotika et al. |
| 2021/0064908 A1 | 3/2021 | Semenov |

(Continued)

FOREIGN PATENT DOCUMENTS

WO    2018/022160 A1    2/2018

OTHER PUBLICATIONS

Szegedy, C., et al., "Going deeper with convolutions", arXiv.org 1409.4842v1, pp. 1-12 (Sep. 17, 2014).

(Continued)

*Primary Examiner* — Daniel G Mariam
(74) *Attorney, Agent, or Firm* — Shook, Hardy & Bacon L.L.P.

(57) ABSTRACT

Image data having text associated with a plurality of text-field types is received, the image data including target image data and context image data. The target image data including target text associated with a text-field type. The context image data providing a context for the target image data. A trained neural network that is constrained to a set of characters for the text-field type is applied to the image data. The trained neural network identifies the target text of the text-field type using a vector embedding that is based on learned patterns for recognizing the context provided by the context image data. One or more predicted characters are provided for the target text of the text-field type in response to identifying the target text using the trained neural network.

20 Claims, 10 Drawing Sheets

(56) References Cited

U.S. PATENT DOCUMENTS

2021/0182550 A1   6/2021   Semenov

OTHER PUBLICATIONS

International Preliminary Report on Patentability received for PCT Application No. PCT/US2021/027734, dated Dec. 1, 2022, 11 pages.

100

Xin Cube Inc
380 Francisco St
San Francisco
CA 94133
US
Tel: (415) 989-1188  Fax: (415) 989-2288
Email: admin@xincube.com
Website: www.xincube.com Invoice No: INV10100005
Currency: USD

Invoice

Bill To
John
Synex Inc
128 AA Juanita Ave
Glendora
CA 91740 US

Ship To
John
Synex Inc
128 AA Juanita Ave
Glendora
CA 91740 US

Phone:   Fax:   Phone:   Fax:

| Date | 19-Oct-2010 | Order No | | Sales Person | Charles Wooten |
|---|---|---|---|---|---|
| Shipping Date | 19-Oct-2010 | Shipping Terms | | Terms | 30 days |

| ID | SKU / Description | Unit Price | Qty | Amount |
|---|---|---|---|---|
| PS.V860.05 | AMD Athlon X2DC-7450, 2.4GHz/16B/160GB/SMP-DVD/VB | 580.00 | 6.00 | 3,480.00 |
| PS.V880.37 | PDC-E5300 - 2.6GHz/16B/320GB/SMP-DVD/FDD/VB | 645.00 | 4.00 | 2,580.00 |
| LC.V890.02 | LG 18.5" WLCD | 230.00 | 10.00 | 2,300.00 |
| HP.Q754.71 | HP LaserJet 5200 | 1,100.00 | 1.00 | 1,100.00 |

Note:
Thanks for your business!

103

| Sub Total: | 9,460.00 |
|---|---|
| Discount: | 0.00 |
| GST | 473.00 |
| | 0.00 |
| | 0.00 |
| Shipping: | 0.00 |
| Total: | 9,933.00 |
| Deposit: | 0.00 |
| Amount Due: | 104 → 9,933.00 |

Page: 1 / 1

ABC COLLEGE
Invoice for Tuition and Fees

On Account for   0000001                                         Statement Date   06/01/14

Student Name
Home Street Address                                                                          508
Home City, State and Zip Due Date: July 15, 2014

| Date | Term | Description | Charges | Payments/Credits | Balance Due |
|------|------|-------------|---------|------------------|-------------|
| 04/01/14 | | Balance Forward | | 350.00 | |
| 08/28/14 | 14/FA | Student Activity Fee | 225.00 | | |
| 08/28/14 | 14/FA | Board-15 Meals Per Week | 2,100.00 | | |
| 08/28/14 | 14/FA | Health Center Fee | 100.00 | | |
| 08/28/14 | 14/FA | Dormitory Room | 2,265.00 | | |
| 08/28/14 | 14/FA | Tuition | 18,550.00 | | |
| 08/28/14 | 14/FA | ABC Top Ten Scholarship | | 500.00 | |
| 08/28/14 | 14/FA | President's Scholarship | | 7,500.00 | |
| 08/28/14 | 14/FA | ABC College Subsidized Loan | | 2,200.00 | |
| 08/28/14 | 14/FA | Unsubsidized Stafford Loan | | 2,737.00 | |
| 08/28/14 | 14/FA | Bank Select Alternative Loan | | 3,750.00 | |
| | | Payment Plan Expected | | 2,000.00 | |
| | | BALANCE BEFORE PENDING AID | | | 4,203.00 |
| | | Pending Financial Aid | | | |
| | | Foundation Scholarship | | 100.00 | |
| | | ABC Student Employment credit (amount remaining) | | 900.00 | 504 |
| | | 506 → Total: | 23,240.00 | 20,037.00 | 3,203.00 |

502

P.O. Box 123 • Cityplace, State • 12345-6789 • Phone: 555-5555 • Fax: 555-555-5555 • www.abccollege.edu

*FIG. 5.*

*MOBY DICK.* 501 the crotch, Ahab held it out, exclaiming—"Look ye, Nantucketer; here in this hand I hold his death! Tempered in blood, and tempered by lightning are these barbs; and I swear to temper them triply in that hot place behind the fin, where the White Whale most feels his accursed life!"

"Then God keep thee, old man—see'st thou that"— pointing to the hammock—"I bury but one of five stout men, who were alive only yesterday; but were dead ere night. Only that one I bury; the rest were buried before they died; you sail upon their tomb." Then turning to his crew—"Are ye ready there? place the plank then on the rail, and lift the body; so, then—Oh! God"—advancing towards the hammock with uplifted hands—"may the re-surrection and the life——"

"Brace forward! Up helm!" cried Ahab like lightning to his men.

But the suddenly started Pequod was not quick enough to escape the sound of the splash that the corpse soon made as it struck the sea; not so quick, indeed, but that some of the flying bubbles might have sprinkled her hull with their ghostly baptism.

As Ahab now glided from the dejected Delight, the strange life-buoy hanging at the Pequod's stern came into conspicuous relief.

"Ha! yonder! look yonder, men!" cried a foreboding voice in her wake. "In vain, oh, ye strangers, ye fly our sad burial; ye but turn us your taffrail to show us your coffin!"

CHAPTER CXXXII.

THE SYMPHONY.

It was a clear steel-blue day. The firmaments of air and sea were hardly separable in that all-pervading azure; only, the pensive air was transparently pure and soft, with a woman's look, and the robust and man-like sea heaved with long, strong, lingering swells, as Samson's chest in his sleep.

Hither, and thither, on high, glided the snow-white wings of small, unspeckled birds; these were the gentle thoughts of the feminine air; but to and fro in the deeps, far down in the bottomless blue, rushed mighty leviathans, sword-fish,

*FIG. 7.*

TEXT RECOGNITION FOR A NEURAL NETWORK

CROSS REFERENCE TO RELATED APPLICATIONS

This application is a continuation of and claims the benefit to U.S. application Ser. No. 16/882,091, filed May 22, 2020, the contents of which is hereby incorporated by reference in its entirety.

BACKGROUND

Text recognition and computer vision typically involves a computer recognizing text in an image and predicting characters for the text. For instance, if an image of text is in a JPEG format or a PDF format, the text may not be machine readable. The computer may perform optical character recognition (OCR) on the image so as to predict characters for the text. Text recognition and computer vision may also involve analyzing the OCR-predicted text using a natural language processor (NLP) to identify and extract relevant content.

SUMMARY

At a high level, aspects described herein relate to improvements in text recognition for computer vision technology. A text recognition system receives an image having images of text. The image includes image data, such as target image data and context image data. The target image data may provide images of the target text that should be extracted from the image, and the context image data may provide a context for the target image data or the target text. The target text may be associated with a text-field type, which generally relates to specific information found within the image. By way of example, the text-field type for an image of a financial document (e.g., an invoice) may include an amount due, due date, contact information, account number, or the like. While these are examples of text-field type for an image of a financial document, the text-field type may depend on the type of images for which the text recognition system is utilized.

The text recognition system uses a trained neural network. The trained neural network may be trained to predict characters for the text-field type. The trained neural network is constrained to a set of characters that are expected to appear for the text-field type. The set of characters may include alphabetical, numeric characters, punctuation, or symbols. The trained neural network can identify and predict characters for the target text based on the context provided by the context image data. The trained neural network can also identify and predict characters for the target text based on the target image data.

The trained neural network may include an encoder and a sequence generator that are trained end-to-end. The encoder may be a neural network that generates a vector embedding for the text-field type based on the context image data and the target image data. The vector embedding may capture important characteristics (e.g., text, shapes, spacing, or shadings) provided by the context image data or the target image data. In some aspects, the vector embedding is based on learned patterns for recognizing the context provided by the context image data or patterns for recognizing the target text based on the target image data.

The vector embedding is then communicated to the sequence generator, which decodes the vector embedding to predict the characters for a text-field type. The sequence generator may be a classifier, a dense layer, a machine learning model, or a neural network that predicts one or more characters based on the vector embedding. In some instances, the encoder may be a convolution neural network and the sequence generator may be a recurrent neural network.

The trained neural network may analyze substantially all of the image (or substantially all of a portion of the image capturing the text) to identify or predict characters for the target text. In some instances, an interface may assist the sequence generator in processing text-field types having a particular text field length. For instance, the sequence generator might not be able to identify target text for text fields having twenty or more text characters (including spaces).

The neural network may be trained based on training image data, annotations for a text-field type, and a set of characters that constrain the neural network. The neural network may be trained on high-resolution images. To reduce the computing resources needed to process high-resolution images, the neural network may be a single channel neural network that processes images in a grey scale. In some instances, an existing neural network architecture can be modified from a three-channel neural network (where each channel is dedicated to a particular color) to a single channel neural network.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 1 illustrates an example image of an invoice;

FIG. 5 is an example illustration of an image of having text, in accordance with aspects described herein;

FIG. 7 is an example illustration of an image of a page from a book, in accordance with aspects described herein;

DETAILED DESCRIPTION

The present technology includes methods, systems, and computer storage media for identifying relevant text within an image and providing predicted characters for that relevant text. Technical challenges arise in text recognition and computer vision because images having text may arrange that text in a variety of ways, making it difficult for a computer to identify relevant text from an image. For example, in the financial industry, vendors may generate invoices capturing similar information (e.g., an amount due or due date), but provide that information in different ways. Vendors may place an amount due or due date in specific locations, use different formats or graphical representations, or use different wording (such as communicating the amount due with the words "Amount Due" or "Total"). Conventional technology generally fails to provide an adequate solution to handle these variations.

Figure 2:
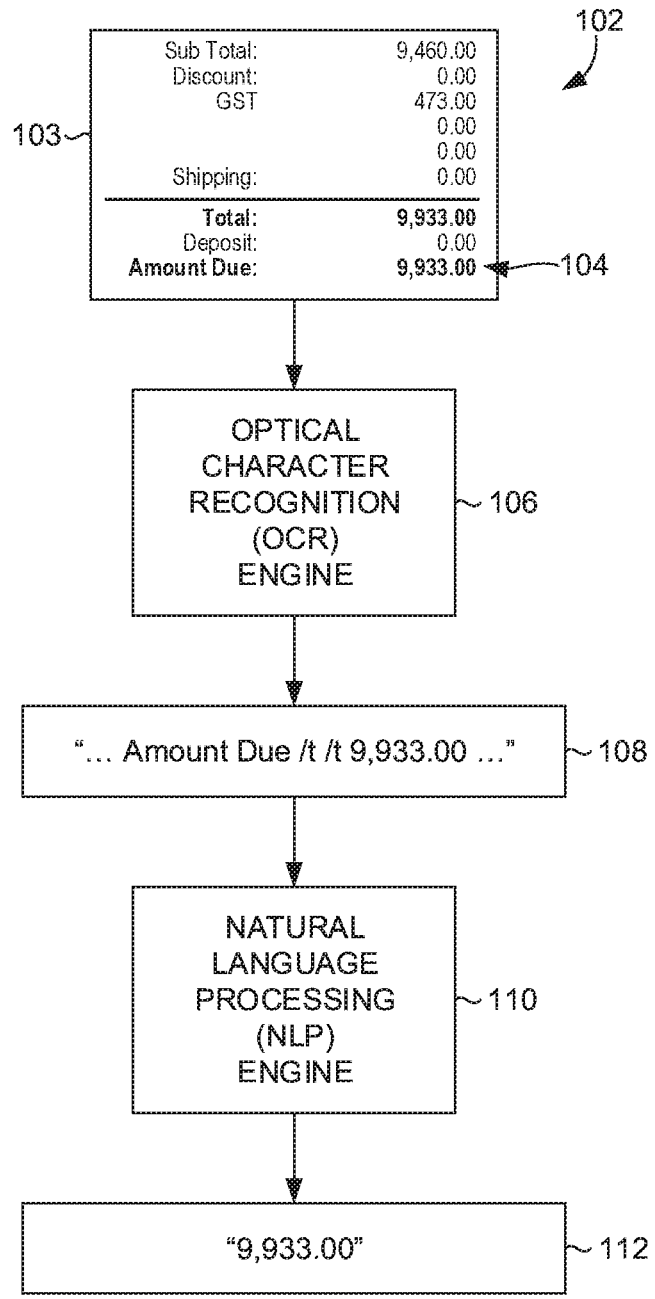
FIG. 2 illustrates conventional technologies that utilize an optical character recognition (OCR) engine in combination with a natural language processing (NLP) engine that is applied to the image of FIG. 1.

FIG. 2 provides an example of conventional computer vision technologies that might be used on the example image 100 of FIG. 1, but generally fail to achieve the results of the text recognition system described herein. FIG. 1 illustrates an example image 100 having text. As illustrated, the image 100 may have a portion 103 indicating an amount due 104. The image 100 of FIG. 1 may be provided to conventional computer vision technologies for processing as shown in FIG. 2.

As shown in FIG. 2, conventional computer vision technologies may rely on an optical character recognition (OCR) engine 106 and a post-processing engine, such as NLP engine 110. The OCR engine 106 may be applied to the image 100 in order to provide characters captured by the image. The OCR engine 106 predicts characters for all of the text within the image. This is a computational heavy task, especially if there is a large amount of text within the image 100. There may be a large amount of text if the image 100 is a multipage document (such as a credit card bill). The OCR engine 106 will provide all of the predicted characters 108, which are then analyzed by natural language processing (NLP) engine 110, machine learning model, or other post-processing engines. This too is a computational heavy task as the NLP engine 110 has to have algorithms that parse the predicted characters 108 to identify the relevant text. The NLP engine 110 may then provide an indication 112 that $9,933.00 is the amount due.

However, there are problems associated with these conventional computer vision technologies. There are two sources for an error: the OCR engine 106 or the NLP engine 110. It is not uncommon for an OCR engine 106 to "misinterpret" (or inaccurately predict) characters from images, especially for lower quality images that are taken by a person's cell phone. For example, the OCR engine 106 might misinterpret a '1' as an 'I' based on the quality of the image (e.g., low resolution, poor lighting, or blurring). The indication 112 of the NLP engine 110 is only as good as the accuracy of OCR engine 106.

Additionally, the OCR engine 106 is a computational heavy task as it requires a region proposal engine to determine where each character of text is within the image, and then applying an OCR engine 106 to each text character. This is partly why it is a computational heavy task for images having a significant amount of text (e.g., a multipage credit card bill).

The other source of error is the NLP engine 110. The algorithms of the NLP engine 110 might fail to correctly parse the predicted characters so as to identify the relevant text. Additionally, the NLP engine 110 might fail to identify the relevant text based on the inaccuracies of the OCR engine 106.

Further, the OCR engine 106 and NLP engine 110 (other post-processing engines) generally do not account for the context of the relevant text, the visual characteristics of the image, or the visual appearance of the text, such as its font size or color. For instance, the OCR engine 106 or the NLP engine 110 (or other post-processing engines) cannot account for the visual characteristics around the text, such as a bounding box or a textured background. This is because the OCR engine 106 and NLP engine 110 (or other post-processing engines) only predict characters and then parse the predicted characters using post-processing algorithms.

To solve these and other problems, the technology described herein provides a neural network to identify relevant text within an image and predict characters for that relevant text. Specifically, the neural network may receive an image and determine important characteristics of an image for identifying target text. These characteristics may be determined based on training the neural network to learn patterns for recognizing a context of the target text or to learn patterns for the target text itself, or both.

The neural network may conserve computer resources by predicting characters for the relevant text and not the entire text of the image. Additionally, the neural network may process substantially all of the image to determine if there is a reoccurring text-field type (e.g., if an amount due appears twice within an image). If there is a reoccurring text-field type, the neural network may utilize the text associated with the reoccurring text-field type so as to improve the accuracy of predicting one or more characters for the target text, which may be beneficial if the target text is blurred. Accordingly, the neural network described herein does not require pre-processing engines (e.g., OCR engine 106 or region proposal engine) or post-processing engines (e.g., NLP engine 110).

The technologies described herein improve the computer by conserving valuable computer resources and improving processing time. For example, image 100 of FIG. 1 was analyzed using Pytesseract, which is an example OCR engine 106. Pytesseract provided predicted characters 108 in about 2.4 seconds. Image 100 of FIG. 1 was also analyzed with Google Vision. Google Vision provided predicted characters 108 in about 2 seconds. It should be appreciated that this time only accounts for the time to provide the predicted characters of the image 100. It does not include the time needed for an NLP engine 110 to process the predicted characters to identify the amount due 104.

Image 100 of FIG. 1 was also analyzed by a neural network implementing the aspects described herein. The neural network identified and provided the amount due 104 in 2 milliseconds. In other words, the neural network identified the amount due 104 and provided predicted text '9,933.00' ten times faster than the time it took other computer vision technologies to merely predict characters for image 100. This is a 90% savings in computing resources. Further, the instant technology achieved an average of 9% improvement in accuracy over conventional computer vision technologies in identifying the target text. The present technology therefore improves the functioning of a computer. By implementing the methods and systems described herein, the instant technologies offer improvements to text recognition and computer vision technologies that has not been achieved using existing technology.

As described in further detail below, a text recognition system including a neural network receives image data having text. The image data includes target image data and context image data, where the target image data includes target text that will be identified by the text recognition system. Based on identifying the target text, the text recognition system will provide predicted characters for the target text. The target text may be associated with a text-field type. The text-field type generally relates to relevant information within the document. For example, referring to image 100 of FIG. 1, the target text of '9,933.00' is associated with an amount due text-field type. The image may include important characteristics that the neural network may learn so as to identify the target text. For instance, the target text may be bold, it may appear larger in comparison with other text of the document, or it may be in a specific format (e.g., XX/XX/XXXX for a due date text-field type). The neural network may learn patterns for these characteristics so as to identify the relevant text and predict one or more characters for that text.

As mentioned, the image data may also include context image data. The context image data may provide a context for the target image data or the target text. The context image data may include text, shapes, symbols, or the like that provide a basis for identifying the target text. For instance, the context image data may include important characteristics, such as a bounding box around the target text, shading around the target text, a location of the target text in relationship to the location of other text (e.g., Amount Due), or the like, to identify the target text.

During training, a neural network may "learn" these important characteristics so as to develop sophisticated patterns for identifying the target text. For example, the neural network may learn to identify the target text based on patterns of text, shapes, symbols, or the like found in the context image data. As a further example, the neural network may learn to identify the target text based on the appearance of the target text or the text having a specific format (e.g., XX/XX/XXXX for a due date text-field type). It should be appreciated that the neural network may utilize substantially all the image data, including the context image data and the target image data, to identify the target text.

The trained neural network may include an encoder and a sequence generator that is trained end-to-end. The encoder may be a neural network (e.g., a convolution neural network) that generates a vector embedding. The sequence generator may be a classifier, dense layer, a machine learning model, or neural network that decodes the vector embedding generated by the encoder. In some instances, the sequence generator is a recurrent neural network. The encoder and sequence generator may be trained end-to-end so as to work together to learn patterns for identifying and predicting characters for the target text. For example, the encoder may learn to generate a vector embedding based on important characteristics of the image. The sequence generator may learn to decode the vector embedding so as to provide predicted characters for the target text.

The trained neural network may be trained to identify one or more text-field types. The trained neural network may be constrained to a set of characters for each text-field type. The set of characters may include alphabetical characters, numerical characters, punctuation characters, or symbols that are expected for the specific text-field type. Continuing with the example above, the text-field type for an amount due might include a set of characters including the numbers zero through nine and a period. This may prevent the neural network from predicting an 'I' for a '1' in analyzing an image of '165.00'. The set of characters are described as being expected for the text-field type because any individual character from the set of characters may likely appear in association with that particular text-field type.

The trained neural network may include an interface that assists the sequence generator in identifying or predicting characters for a text-field type having a particular text field length. For instance, the number of characters expected for one text-field type (e.g., an amount due) might be lower than the number of characters expected for another text field (e.g., an invoice number). A larger number of characters (e.g., greater than thirty characters) may cause errors in the sequence generator correctly identifying or predicting the target text.

As mentioned, the trained neural network may be trained end-to-end (e.g., the encoder and the sequence generator may be trained end-to-end). The trained neural network may be trained based on training image data, annotations for a text-field type, and the set of characters that constrain the neural network. The trained neural network may also be trained on high-resolution images. To reduce the computing resources needed to train the neural network on high-resolution images, the neural network may be a single channel neural network that processes images in grey scale. In some instances, an existing neural network architecture can be modified from a three-channel neural network (where each channel is dedicated to a particular color) to a single channel neural network.

Figure 3:
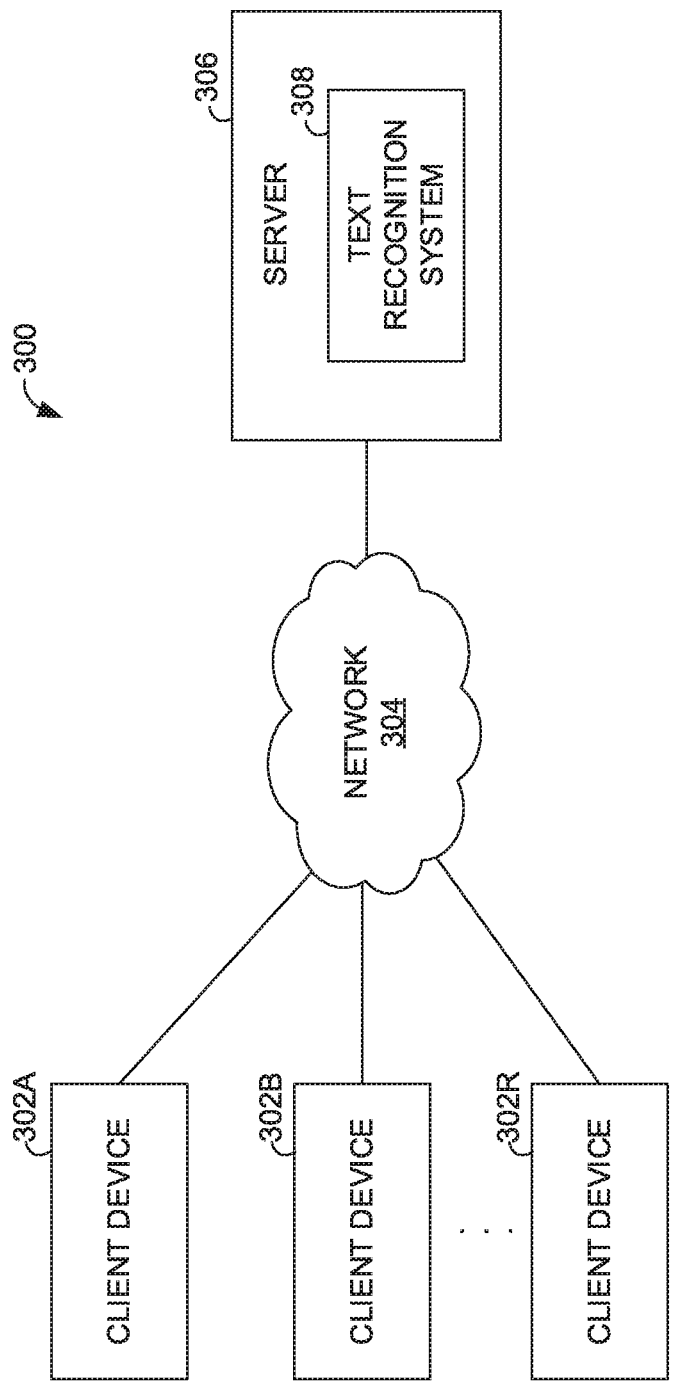
FIG. 3 is a block diagram of an example operating environment suitable for implementing aspects of the disclosure.

FIG. 3 depicts a block diagram of example operating environment 300 suitable for use in implementing the described technology. Generally, environment 300 is suitable for using a neural network to recognize relevant portions of text within an image and predict one or more characters for that text. It should be understood that operating environment 300 shown in FIG. 3 is an example of one suitable operating environment.

This and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. It should also be understood that any number of user devices, servers, and other components may be employed within operating environment 300. Each may comprise a single device or multiple devices cooperating in a distributed environment or in the cloud.

Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, some functions may be carried out by a processor executing instructions stored in memory as further described with reference to FIG. 10.

As illustrated, operating environment 300 includes client devices 302A and 302B through 302R, which are in communication via network 304 to server 306. Client device 302B is illustrated as having an ellipsis drawn between it and client device 302R, which is meant to indicate that any number of client devices may be associated with operating environment 300. The arrangement illustrated in FIG. 3, having client devices 302A and 302B through 302R remote from server 306, is but one example. Each of the components illustrated may be implemented via any type of computing device, such as computing device 1000 described in connection to FIG. 10.

These components may communicate with each other via a network, such as network 304, which may be wired, wireless, or both. Network 304 can include multiple networks, or a network of networks, but is shown in simple form so as not to obscure aspects of the present disclosure. By way of example, network 304 can include one or more wide area networks (WANs), one or more local area networks (LANs), one or more public networks such as the Internet, or one or more private networks. Where network 304 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 304 is not described in significant detail.

Client devices, such as client devices 302A through 302R, can be any type of computing device capable of being operated by a client, which may be any person or entity that interacts with server 306. In some implementations, client devices 302A through 302R are the type of computing device described in relation to FIG. 10. For example, client device 302A may be embodied as a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device. Client device 302A can include a display device for displaying an image. Although reference has been made only to client device 302A, it is intended here and throughout this disclosure that client devices 302B through 302R are equally considered.

Client device 302A can include one or more processors and one or more computer-readable media. The computer-readable media may include computer-readable instructions executable by the one or more processors. The instructions may be embodied by one or more applications, such as application 310, shown in FIG. 3. Application 310 is referred to as a single application for simplicity, but its functionality can be embodied by one or more applications in practice. Application 310 is generally capable of facilitating the exchange of information between client devices 302A through 302R or server 306. For example, application 310 facilitates receiving information or sending information, such as images of text, which are utilized or generated by server 306. As described in greater detail below, the image may be submitted to the text recognition system 308 so as to identify relevant text and provide predicted characters for that text. The application 310 may also facilitate receiving or presenting the results of the text recognition system 308, such as one or more characters for the relevant portions of text.

Application 310 may comprise a web application, which can run in a web browser, and could be hosted at least partially on the server-side of operating environment 300. Application 310 can comprise a dedicated application, such as an application having analytics functionality. In some cases, application 310 is integrated into the operating system (e.g., as a service or program). It is contemplated that "application" be interpreted broadly. In some embodiments, application 310 may be integrated with text recognition system 308, which is illustrated as residing on server 306.

Server 306 generally supports text recognition system 308. Server 306 includes one or more processors, and one or more computer-readable media. The computer-readable media includes computer-readable instructions executable by the one or more processors. The text recognition system 308 may have instructions that implement the neural network, described in additional detail below with reference to FIG. 4.

While FIG. 3 illustrates text recognition system 308 wholly residing on server 306, it will be appreciated that other distributed arrangements can be employed, for example, where client device 302A hosts one or more functions of text recognition system 308, while another one or more functions are hosted on a remote server. Additionally, text recognition system 308 may wholly reside at client device 302A. It should be appreciated that while text recognition system 308 is depicted as a single system, it can function as multiple systems capable of performing all the attributes that are described herein.

Figure 4:
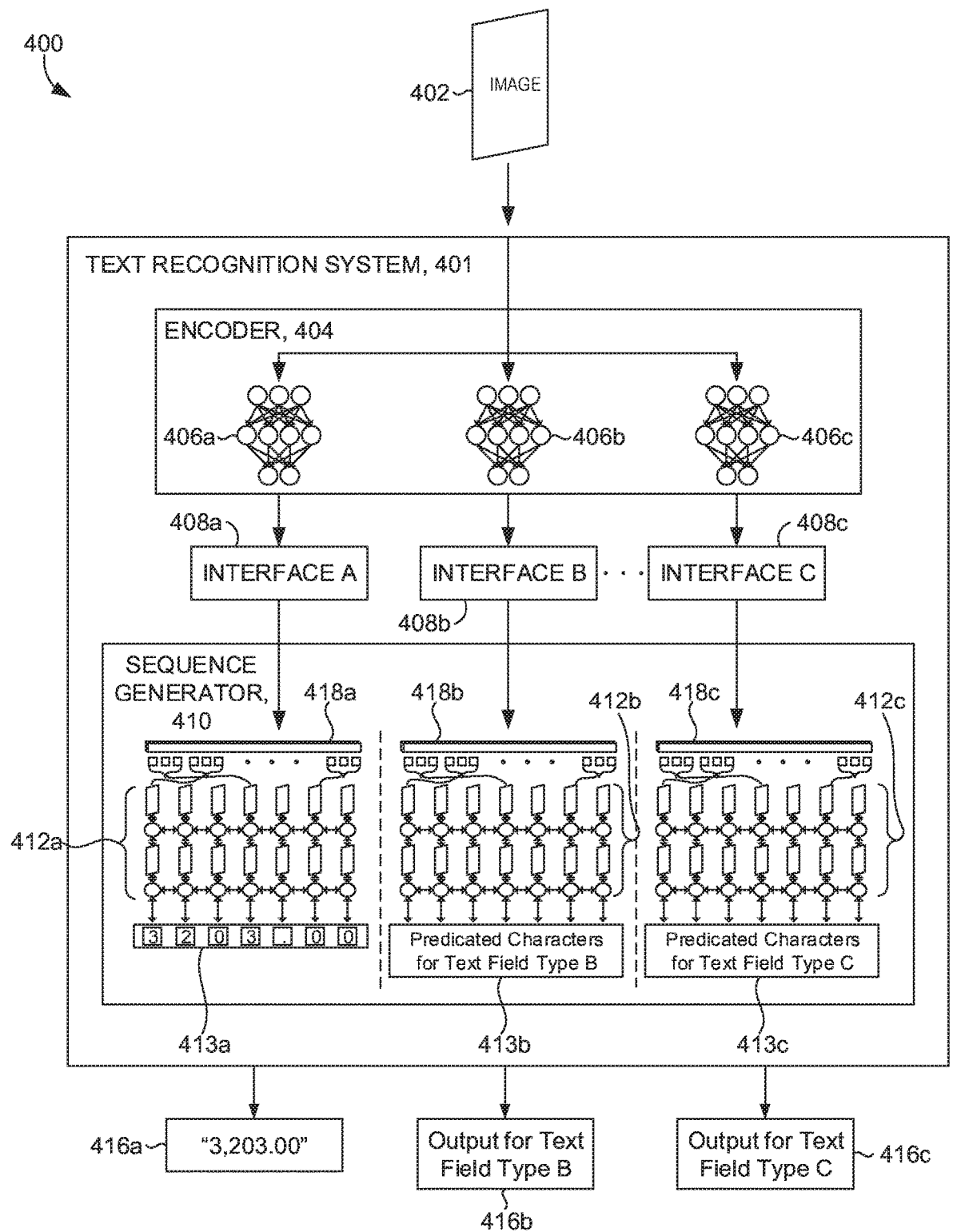
FIG. 4 is an example block diagram of an architecture for a neural network, in accordance with aspects described herein.

With reference now to FIG. 4, block diagram 400 of text recognition system 401 is provided. FIG. 4 is just one example arrangement suitable for implementing the technology; however, other arrangements are sufficient for use as well. Text recognition system 401 may be employed as text recognition system 308 of FIG. 3.

While described in greater detail herein, text recognition system 401 may utilize an encoder 404 and a sequence generator 410 to analyze an image and output predicted characters for target text associated with a text-field type. As illustrated, the encoder 404 may include a one or more neural networks. While the sequence generator 410 is also illustrated as one or more neural networks, the sequence generator 410 may be a classifier, dense layer, or machine learning model for decoding the vector embedding generated by the encoder 404. Additionally, text recognition system 401 may utilize one or more interfaces 408*a-c*. The one or more interfaces 408*a-c* may allow the sequence generator 410 to process specific text-field types.

Text recognition system 401 may analyze an image 402 including text. Image 402 may include text that is captured by the image data. Text recognition system 401 may receive an image 402 from a client device, such as client device 302A. A client may use the client device to capture an image of text, such as an image of a document having text (a form, a page of a book, an invoice, or the like), an image of a web site, or any image having text. By way of example, a client may use the client device to capture images 500, 600, or 700 of FIGS. 5-7, and submit them as image 402 to text recognition system 401.

It is intended that the term "image" can be interpreted broadly to include any visual information. The image may or may not have machine readable text (e.g., based on using an OCR engine). In some aspects, the image 401 may be raw image data without machine readable text. While text recognition system 401 can analyze images having machine readable text, an advantage of text recognition system 401 is that it does not require the image to include machine readable text, which would rely on further processing power based on using an OCR engine, such as OCR engine 106. It should be appreciated that by utilizing the methods and systems described herein, the text recognition system 401 may process high-resolution images (e.g., 850×1100 pixels).

A client may submit an image of a text to the text recognition system 401 in order for the text recognition system 401 to identify relevant portions of text (e.g., text associated with a text-field type) and provide one or more predicted characters for the relevant text. Referring to FIG. 5, the text recognition system 401 may detect target text 502 associated with text-field type (e.g., an amount due) and predict one or more characters for the text-field type, such as one or more predicted characters 413a-c.

As used herein, the term "text-field type" relates to specific information communicated by the text associated with the image. Text recognition system 401 may identify a text-field type as it may relate to a particular category of information. For example, a text-field type may be relevant information that should be extracted from a plurality of non-standardized documents. In some aspects, images (or images of documents) may include a plurality of text-field types. It should be appreciated that the text-field type may be associated with specific portions of text found within the text of the image. Text recognition system 401 may provide a predicted character for text associated with the text-field type (e.g., target text) but may not provide a predicted character for text that is not associated with the text-field type (e.g., text in the context image data). In some aspects, the text-field type may be associated with relevant information or relevant text that should be extracted from the image.

A first and second image may include the same text-field type, but they may present that text-field type using different formats, content, graphics, or locations. For example, when the technology described herein is applied to a financial document (e.g., a bill, invoice, receipt, or purchase order), such as image 500 of FIG. 5, the text-field type may relate to a balance due, a due date, contact information, account number, invoice number, or the like. Hence, the text-field type for a financial document may relate to information about a transaction between two people or companies. While images of the certain documents (e.g., financial documents) include similar text-field types, the images may present those text-field types in vastly different ways.

Each text-field type may be associated with target text. As used herein, the term "target text" may be text associated with the text-field type. Text recognition system 401 will provide one or more predicted characters 413a-c for the target text. Referring to FIGS. 4-5, the text recognition system 401 may provide target text 502 of '3,203.00' as one or more predicted characters 413a since it is associated with an amount due text-field type.

At a high level, text recognition system 401 may utilize an encoder 404 and a sequence generator 410 that are trained end-to-end. The encoder 404 may be a deep neural network (DNN) that encodes an image using a vector embedding (e.g., vector embedding 418a). The encoder 404 may be a convolution neural network (CNN). It should be appreciated that the encoder 404 may include one or more neural network layers 406a-c to analyze the image 402.

The sequence generator 410 may be any classifier, dense layer, or neural network that decodes the vector embedding generated by the encoder 404. In some aspects the sequence generator 410 is a recurrent neural network (RNN). As illustrated, the sequence generator 410 may include one or more neural network layers 412a-c to analyze the vector embeddings generated by the encoder 404.

Text recognition system 401 may also utilize one or more interfaces 408a-c (also referred to as a "text-field type interface"). The one or more interfaces 408a-c may be associated with particular text-field types. The one or more interfaces 408a-c may increase the accuracy of the sequence generator 410 in predicting characters for text-fields having a particular length of characters. The one or more interfaces 408a-c may also reduce the training time for training the text recognition system 401. The encoder 404, sequence generator 410, and the one or more interfaces 408a-c may be trained end-to-end.

While the encoder 404 and sequence generator 410 are illustrated as a single component having one or more neural networks, it is contemplated that the encoder 404 is a plurality of encoders, where each encoder includes a single neural network. Similarly, sequence generator 410 may be a plurality of sequence generators, where each sequence generator is associated with a single classifier, dense layer, or neural network. Additionally, the one or more interfaces 408a-c are illustrated as a plurality of interfaces. It is contemplated that the one or more interfaces 408a-c may be a single interface. In some aspects, the text recognition system 401 may include an encoder, an interface, and a sequence generator that are trained end-to-end for a particular text-field type.

Although the various blocks of FIG. 4 are shown with blocks and lines for the sake of clarity, in reality, delineating various components of a neural network is not so clear, and metaphorically, the lines and blocks would more accurately be grey and fuzzy.

Continuing, and at a high level, encoder 404 includes one or more neural network layers 406a-c. Based on training encoder 404, as described in greater detail in reference to FIG. 8, encoder 404 may utilize the one or more neural network layers 406a-c to output one or more vector embeddings 418a-c for the image 402. As described in greater detail below, an image includes target image data and the context image data, so the vector embeddings 418a-c of image 402 may include vector embeddings for the target image data or the context image data, or a combination thereof. In some aspects, the one or more neural network layers 406a-c may generate a vector embedding (e.g., vector embedding 418a) for a particular text-field type. It is contemplated that the one or more neural network layers 406a-c of the encoder 404 may be employed in parallel, thereby generating a vector embedding for different text-field types simultaneously. Similarly, the one or more neural network layers 412a-c of the sequence generator 410 may be employed in parallel, thereby decoding vector embeddings for different text-field types simultaneously.

The vector embeddings 418a-c may be vectors in a dimensional space. The vector embeddings 418a-c may communicate important characteristics of the image 402 that can be used for identifying the text-field type. The vector embeddings 418a-c may be specific to a particular text-field type. While some of those characteristics are described in greater detail below, these are merely examples and are by no means a non-exhaustive list. It would be impossible to describe all of the characteristics included in a vector embedding. Generally speaking, the vector embedding may be based on learned patterns for recognizing the context provided by the context image data. Similarly, the vector embedding may be based on learned patterns for recognizing the appearance, content, or form of the target text that is provided by the target image data. The text recognition system 401 learns the important characteristics (or patterns) for identifying a text-field type (or target text associated therewith). Because the text recognition system 401 includes DNNs, it is difficult to define the patterns identified by the text recognition system 401, or more specifically, the encoder 404 and the sequence generator 410.

With that said, the patterns included in the vector embeddings 418a-c may be detectable based on feeding the text recognition system 401 an original image and a modified image. The modified image includes a modification (e.g., moving text or shapes, or removing text or shapes entirely) to a portion of the original image. If the modification to the original image increases (or decreases) an accuracy, such as a per-character or text-field type confidence score, of one or more predicted characters, it can be determined that the encoder 404 generates a vector embedding based on characteristics (e.g., content, appearance, or form) of the modified portion. For instance, referring to FIG. 6, image 600 can be submitted as an original image and a modified image can be submitted with a modification that removes reoccurring text, such as text 606 or text 602. If the modification of removing text 606 decreases a statistical certainty (e.g., the per-character or text-field type confidence score) of predicting '456.00' as the amount due, it can be determined that encoder 404 utilizes the vector embeddings 418*a*-*c* based on reoccurring text. It should be appreciated that the encoder 404 may generate a single vector embedding for an image of a multi-page document (e.g., an image of multiple pages of a credit card bill). It is contemplated that the encoder 404 generates a plurality of vector embeddings for an image of a multi-page document (e.g., an image of multiple pages of a credit card bill).

The encoder 404 may provide the vector embeddings 418*a*-*c* to one or more interfaces 408*a*-*c*. In some aspects, the vector embeddings 418*a*-*c* associated with the particular text-field type is provided to an interface associated with the text-field type. Hence, the one or more interfaces 408*a*-*c* may be specific to a particular text-field type. In some aspects, the one or more interfaces 408*a*-*c* are based on the maximum length of the character sequence being predicted. The one or more interfaces 408*a*-*c* may apply one or more classifiers to generate a tensor that is based on the character length. The sequence generator 410 may then utilize the vector embeddings 418*a*-*c* or the tensor (or both) in identifying or generating one or more predicted characters 413*a*-*c*. It should be appreciated that the sequence generator 410 may utilize the tensor only and not the vector embeddings 418*a*-*c*, for example, to simplify the model. The predicted characters 413*a*-*c* may then be provided to a client device as relevant text 416*a*-*c* for a specific text-field type. For example, in analyzing image 500 of FIG. 5, the text recognition system 401 may provide '3,203.00' as an amount due.

Referring more specifically to encoder 404, the encoder 404 may be any machine learning model, such as a DNN. Encoder 404 may receive an image, such as image 500, and generate one or more vector embeddings 418*a*-*c*. In some aspects, the encoder 404 may be a CNN. Accordingly, the one or more neural network layers 406*a*-*c* may include one or more convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

In some aspects, the encoder 404 uses an existing CNN architecture having pre-trained weights. The existing CNN architecture may then be altered and trained as described herein to generate new weights that are specific to a text-field type. During training, the weights of the pre-trained encoder will be optimized for detecting a text-field type. Example existing CNN architectures include ResNet, VGG-Net, MobileNet, or Inception. One such CNN architecture that can be used by encoder 404 is commonly referred to as Inception and is described in the paper "Going deeper with convolutions," by Christian Szegedy, Wei Liu, Yangqing Jia, Pierre Sermanet, Scott Reed, Dragomir Anguelov, Dumitru Erhan, Vincent Vanhoucke, and Andrew Rabinovich, published Sep. 17, 2014, arXiv.org 1409.4842v1, which is hereby incorporated by reference in its entirety.

The encoder 404 may include one or more neural networks associated with one or more text-field types. In some aspects, each neural network of the encoder 404 is specific to a particular text-field type. For instance, a first neural network may be trained to encode an image for a first text-field type, while a second neural network may be trained to encode an image for a second text-field type. Referring to FIG. 5, text recognition system 401 may employ individual neural networks for a balance due, a due date, contact information, account number, statement date, vendor name, or the like. It is contemplated that encoder 404 may be a single neural network trained to detect a plurality of text-field types.

As mentioned, the encoder 404 may be trained to generate a vector embedding (e.g., vector embedding 418*a*) for a particular text-field type. While training the encoder 404 is discussed in greater detail with respect to FIG. 8, the encoder 404 may be trained end-to-end with the sequence generator 410 based on training data, annotations, and a set of characters that constrain the sequence generator 410. Once trained, the encoder 404 may generate the vector embeddings 418*a*-*c* for context image data or target image data, or a combination thereof, for a new image. In some aspects, the one or more neural network layers 406*a*-*c* may be trained to generate the vector embeddings 418*a*-*c*. It should be appreciated that the one or more neural network layers 406*a*-*c* may be specific to a particular text-field type.

As mentioned, the encoder 404 may generate a vector embedding (e.g., vector embedding 418*a*) for context image data and target image data. In some aspects, the encoder 404 may generate a single vector embedding for both the context image data and target image data. The vector embedding 418*a* may be based on the context of the target text within the image, the target text (including the appearance of the text), target text associated with a specific field type reoccurring in the image, or a combination thereof. In some aspects, the vector embedding 418*a* may be generated based on substantially all of the image. In other aspects, the vector embedding 418*a* may be generated based on substantially all of the portions of the image having the document. In still further aspects, the vector embedding 418*a* may be generated based on substantially all of the portions of the image having text.

As mentioned, the encoder 404 may generate a vector embedding 418*a* based on learned patterns for identifying the text-field type for an image. In some aspects, the encoder 404 may have learned patterns for identifying a text-field type for an image based on one or more characteristics captured by target image data or context image data, or a combination thereof.

The target image data may be the portion of image 402 that includes target text. The target image data may provide a representation of the appearance of the target text (e.g., bold, size, italicized, or the like), content of the target text (e.g., the text characters and any meaning derived from therein), or format of the target text (e.g., a dollar sign and a string of numbers including a period followed by two numbers—such as $100.00). Referring to FIG. 5, the target image data may be the portion of the image including target text 502 (e.g., '3203.00'). It should be appreciated that the target text may include the comma.

The phrase "target image data including the target text" may include the image data (e.g., pixels) corresponding to the target text. For example, the target image data corresponding to the target text may only be those pixels that provide an indication (or shading) of the target text. The phrase "target image data including the text" may also include the image data substantially surrounding the target text in addition to the image data corresponding to the target text. For example, the target image data may include a portion within a hypothetical bounding box or outline that is drawn around the target text. The bounding box or outline may be spaced apart from the image data having the target text (e.g., a character of the target text) by one or more pixels. In some aspects, the bounding box may be spaced apart from the image data (e.g., pixels) corresponding to the target text by at least one of the following pixel counts: at least one pixel, at least five pixels, at least twenty pixels, at least thirty pixels, at least fifty pixels, or at least one hundred pixels.

As mentioned, encoder 404 may generate a vector embedding 418a for the context image data. The context image data provides a context for the target image data (e.g., the target text). As used herein, the term "context" generally includes the portions of the image 402 other than the target image data (e.g., the target text). The encoder 404 may utilize the context image data to determine a relationship between the target image data (or the target text) and the remaining portions of the image 402. The context image data can be a particular portion of the image located above, below, to the side of, or even between the target image data (e.g., the target text).

The context image data or the target image data may provide one or more visual characteristics that the text recognition system 401 (more particularly, encoder 404 or the sequence generator 410, or both) utilizes to identify the target text for a text-field type. While several visual characteristics are described herein, these are merely examples and are by no means an exhaustive list. Because the text recognition system 401 utilizes machine learning, the text recognition system 401 can learn patterns for the visual characteristics associated with the image data. As such, text recognition system 401 may rely on sophisticated patterns for the context provided by the context image data or the appearance of the target text, as well as reoccurring target text described in greater detail below. In some instances, the context image data or the target image data is raw image data (e.g., without machine readable text).

The context provided by the context image data may include a relationship between the content (e.g., text, shapes, or symbols) of the context image data and the content of the target image data (e.g., target text). In some instances, the context may include a representation of a location or orientation of the content of the context image data with respect to the target text. In some aspects, the context may include a distance between the content of the context image data and the target text. For example, the context may include spacing between the target text and the content of the context image data. As such, the context may include a lack of content (e.g., empty space having no text, shapes, symbols, or the like). The text recognition system 401 may employ a deeper understanding of important characteristics or patterns provided by the context beyond shapes, text, symbols, or spacing.

Referring to FIG. 5, context image data may generally include portions of the image data other than (or excluding) the target image data or the target text 502 (e.g., '3203.00'). For example, the context image data provides content, such as dashed lines 504 above and below the target text 502. The context image data also provides content, such as text 506 (e.g., 'Total') and text 508 (e.g., 'Balance Due'). The context image data also provides a location or orientation (also referred to as a visual orientation) of text 506 and text 508 with respect to the target text 502. For instance, text 506 has a vertical relationship with target text 502, and text 508 has a vertical relationship with target text 502. The context image data may also provide a representation of a distance between text 506 and text 508 with respect to the target text 502.

Figure 6:
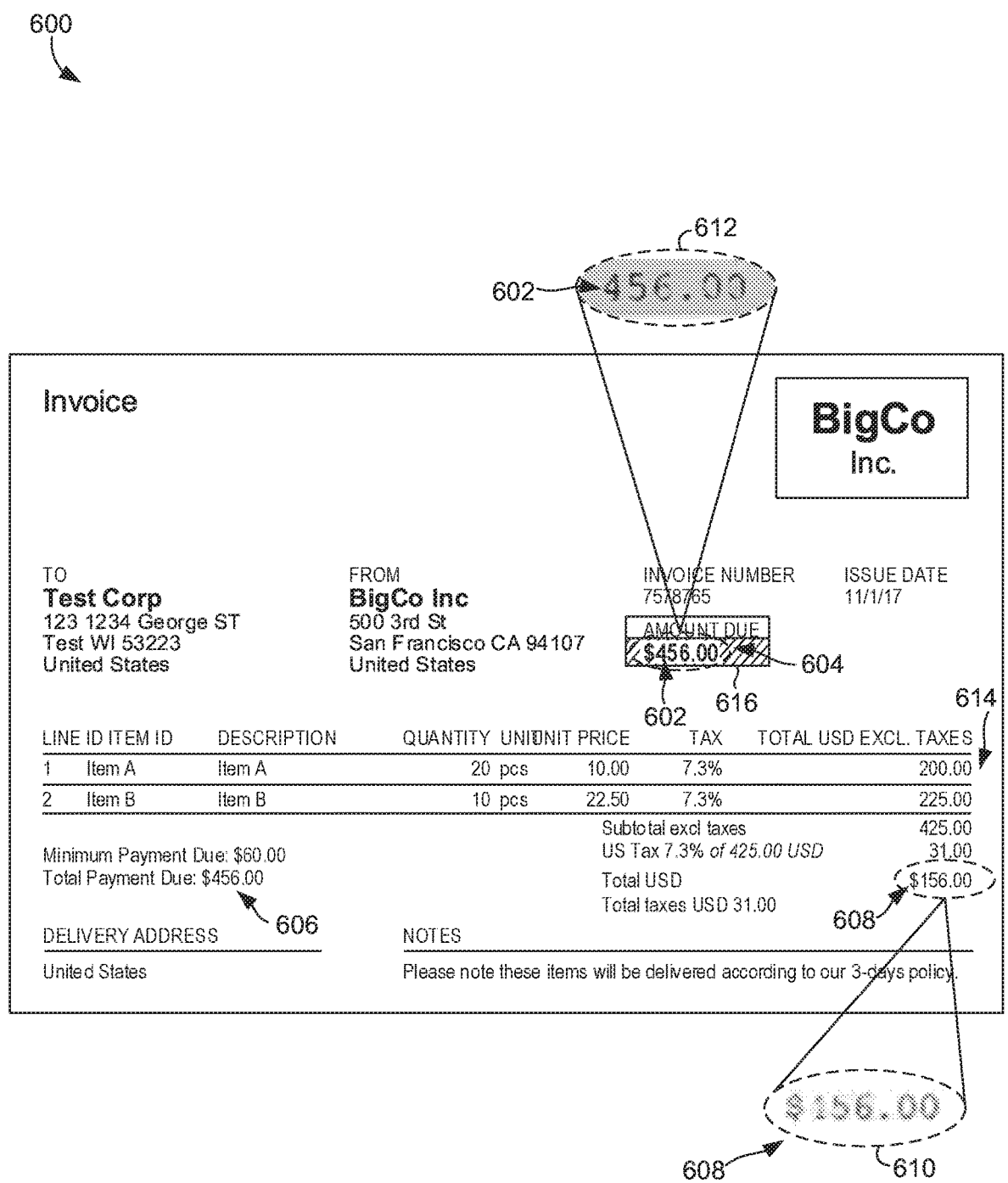
FIG. 6 is an example illustration of an image having blurred text, in accordance with aspects described herein.

Continuing, the context image data may provide a reference for comparing an appearance of the target text. For instance, the target text may be larger than the text in the context image data. Additionally, the target text may appear bolder when compared to the text in the context image data. For example, referring to FIG. 6, text 602 may appear larger or bolder than text in the context image data, such as text 614. The context image data may also provide a visual appearance of a background (e.g., shading) or shapes surrounding the target text. It should be appreciated that the shapes may include a bounding box, lines, or circles. As illustrated in FIG. 6, the context image data provides shading 604 (depicted as a single hatch) and a bounding box 616. It should be appreciated that an OCR engine, such as OCR engine 106, is unable to account for the visual context provided by the context image data or the visual appearance of the target text, or a combination thereof. This is one of many reasons why existing computer vision technology has failed to achieve the accuracy that is attained by the text recognition system 401.

As mentioned, these are merely examples. The encoder 404 and sequence generator 410 may employ a deeper understanding and recognize patterns beyond shapes, text, symbols, or spacing. For example, the encoder 404 and sequence generator 410 may determine that an invoice from a particular supplier (e.g., Coca-Cola) to a particular buyer (e.g., Target) typically includes a larger amount due than a receipt of a person buying a single soda at a gas station. As such, encoder 404 and sequence generator 410 may learn a pattern for detecting that the invoice is from Coca-Cola to Target and, based on this detection, look for a larger number of characters for an amount due (e.g., $100,000.00) as opposed to a small number of characters (e.g., $1.10). Because the encoder 404 and sequence generator 410 may be deep neural networks, they rely on sophisticated patterns that cannot fully be described herein.

It should be appreciated that the text recognition system 401, such as the encoder 404 and sequence generator 410, can be applied to substantially all of image 402. Alternatively, the text recognition system 401 can be applied to substantially all of the document or text captured by the image. Hence, in some aspects, the context image data and the target image data may comprise substantially all of an image submitted by a client device. In some aspects, the context image data and the target image data may comprise substantially all of the portions of the image that include the text or document. It is contemplated that "substantially all" may refer to 100%, at least 95%, at least 90%, at least 80%, or at least 75% of the image submitted by the client device. It is also contemplated "substantially all" of a document or text associated with an image may refer to 100%, at least 95%, at least 90%, at least 80%, or at least 75% of the document or text associated with an image.

While not illustrated, the image 402 may include a document having a plurality of pages of text, which may be common in some financial documents (e.g., a credit card bill). Because the technologies described herein conserve computing resources, aspects may analyze image data for an entire image submitted by a client device or at least the portion of the image including the document or text.

Utilizing substantially all of the image (or the document/ text captured by the image) may improve the accuracy in predicting one or more characters because the text recognition system 401 can use the context image data or the target image data, or a combination thereof, to identify the target text. Additionally, the text recognition system 401 (e.g., the encoder 404 and sequence generator 410) may confirm its prediction if the target text reoccurs within the image, as discussed in greater detail with respect to FIG. 6. This is in contrast to computer vision models that rely on region proposals proposed by region proposal engines, such as region proposal that is proposed by a region proposal engine.

Returning to FIG. 4, encoder 404 may generate the vector embeddings 418a-c for the target image data or the context image data, or a combination thereof. For example, once trained, encoder 404 may generate vector embeddings 418a-c based on learned patterns for the target image data (e.g., appearance, content, or format of the target text) or the context image data (e.g., content or lack of content) that may be relevant for detecting target text associated with the text-field type.

The vector embeddings 418a-c may be analyzed by one or more interfaces 408a-c. The one or more interfaces 408a-c generally allow the sequence generator 410 to process a text field having a particular number of text characters. In some instances, the one or more interfaces 408a-c may allow the sequence generator 410 to process text-field types having variable lengths. The one or more interfaces 408a-c may account for (or be based on) a maximum number of characters that are expected (e.g., anticipated) to appear for a text-field type. It should be appreciated that the sequence generator 410 may generally be capable of processing (or predicting) a low number of text characters (e.g., 1-15). However, there may be a decrease in accuracy based on increasing the number of text characters. While in some cases the decrease in accuracy may be addressed by additional training time to accurately identify a text field having a greater number of text characters (e.g., a text field having at least thirty text characters), this consumes a greater amount of computing resources and may not fully address the loss in accuracy. The information provided by the interfaces 408a-c may eliminate the need for the additional training time for a greater number of text characters. Additionally, the interfaces 408a-c may improve the overall accuracy of the sequence generator 410, regardless of how long the sequence generator 410 was trained.

In some aspects, the one or more interfaces 408a-c may be specific to a particular text-field type. For instance, interface 408a may be associated with a first text-field type, and interface 408b may be associated with a second text-field type that is different than the first text-field type. By way of example, when analyzing image 500, interface 408a may be associated with an amount due text-field type, while interface 408b may be associated with a due date text-field type. In some aspects, each of the one or more interfaces 408a-c may utilize a particular classifier that is specific to the text-field type. It is contemplated that the one or more interfaces 408a-c are not specific to a particular text-field type. For instance, interfaces 408a-c may be the same interface that is used for all or a specific set text-field types. In some aspects, one interface (e.g., interface 408a) may be the same interface that is used for all text-field types having under a particular number of anticipated text characters (e.g.,  under 30 anticipated text characters). Another interface (e.g., 408b) may be an interface used for text-field types over a particular number of anticipated text characters for the field type (e.g., over 30 anticipated text characters).

It should be appreciated that sequence generator 410 may include a classifier, dense layer, a machine learning model, or a neural network that has a limited amount of long-range dependence. The determination of the one or more interfaces 408a-c may allow the sequence generator 410 to "focus" on a per-timestep (or per-character) level. For example, the sequence generator 410 may copy a 2048 layer thirty-one times (for a max-length of thirty-one sequences), and the input to each timestep of the sequence generator 410 may be equal. This can reduce the accuracy in predicting characters for text-field types that are associated with a greater number text characters, such as a vendor name text-field type or invoice number text-field type, because the characters toward the end (e.g., the twenty-fifth character) have less to do with the characters toward the beginning (e.g., the first and second characters). Accordingly, the one or more interfaces 408a-c can act as an attention mechanism so that each timestep of the sequence generator 410 can "see" a different piece of the 2048 layer.

Target text may include a string of text characters (e.g., alphabetical, numerical, or punctuation). As illustrated in FIG. 5, the target text to be extracted is '3203.00', which is a string of seven text characters. This may be considered a fairly small number of text characters. In some aspects, the string of text characters may be greater than twenty or even greater than thirty text characters. For example, an invoice number text field may include at least twenty text characters (e.g., "INV10203040-12034-50"). As a further example, a vendor name text field or an account number text field may include up to a string of at least thirty text characters. It should be appreciated that these larger text fields can cause errors in the sequence generator 510.

The one or more interfaces 408a-c may provide a determination to facilitate the detection of the target text. In some aspects, the one or more interfaces 408a-c may provide, as a determination, tensor (e.g., a three-dimensional tensor) with a shape that is based on a per-character length. As discussed in greater detail below, the sequence generator 410 may utilize this determination to predict one or more characters for the target text.

As mentioned, the interface (e.g., interface 408a) may be a dense layer. The dense layer may be a feed-forward dense layer. In some aspects, the dense layer concatenates the output (e.g., vector embeddings 418a-c) of the encoder 404 with a reshaped dense layer to form a new layer (e.g., the tensor having a shape that is based on a per-character length) that is fed into the sequence generator 410. For example, interface 408a may concatenate a 2048 output of the encoder 404 with a reshaped dense layer of 2232 into 31×72 to form a 31×2120 layer that is fed into the sequence generator 410.

The sequence generator 410 generally determines a target text based on the vector embedding (e.g., vector embedding 418a) of the encoder 404. The sequence generator 410 may be a classifier, dense layer, machine learning model, or neural network. As illustrated, in some aspects, the sequence generator 410 may utilize one or more layers 412a-c of a neural network. In some aspects, the sequence generator 410 may be a RNN. The RNN may be a bidirectional RNN. For instance, the bidirectional RNN may have a forward layer and a backward layer. It should be appreciated that a bidirectional RNN may analyze the one or more vector embeddings 418a-c of encoder 404 in different directions (e.g., forward and backward) to improve its detection and prediction of the target text. Hence, a bidirectional RNN may analyze a vector embedding including a string of text characters from a first direction and a second direction. In some aspects, the RNN is a gated recurrent unit (GRU) bidirectional RNN. Using a GRU neural network may reduce the number of trainable parameters. It is contemplated that the RNN is a long short term memory (LSTM) bidirectional RNN. It should be appreciated that the sequence generator 410 may also utilize a softmax dense layer (not illustrated) to predict individual characters (as well as the confidence scores described herein).

The sequence generator 410 may be constrained by a set of characters. The set of characters may include one or more characters that are anticipated for (e.g., likely to appear in association with) the text-field type. The set of characters may include any set of alphabetical characters (e.g., English alphabet A-Z), numerical characters (e.g., 0-9), punctuation (e.g., a comma, period, or hyphen), symbols, or the like. In some aspects, the set of characters may be a dictionary of characters used to transform target text associated with the text-field type to a one-hot encoding character level representation. It should be appreciated that the set of characters provides a per-character prediction for any given target text.

By way of example, referring to FIGS. 4-5, sequence generator 410 may predict characters for a due date text-field type or an amount due text-field type. The set of characters that are expected for the due date text-field type may be the twelve calendar months (e.g., expressed either alphabetically, such as January through December, or numerically, such as 1 through 12), the number of days in a month (e.g., 1 through 31), the year (1800 through 3000), forward slash (/), or the like. The set of characters that constrain the amount due text-field type may be the numerical characters zero through 9 and a period. This can improve the accuracy of predicting characters, for example, because it can overcome problems in OCR engines that might have otherwise predicted the letter 'L' as opposed to the number '1' based on poor image quality. The set of characters that constrain the encoder or the sequence generator 410 may "force" a prediction of a specific character. This is in contrast to conventional technology of FIG. 1, where the OCR engine 106 is not constrained. As such, OCR engine 106 could introduce an error for the predicted characters (e.g., predicted characters 108), which may then cause errors in the analysis provided by the NLP engine 110. The set of characters may eliminate this error.

As mentioned, the sequence generator 410 decodes the vector embeddings 418*a-c* to predict one or more characters for the target text. The sequence generator 410 may utilize the output of the one or more interfaces 408*a-c*. For example, the one or more interfaces 408*a-c* may provide a tensor that is based on a per-character length of the target text. The tensor may allow the sequence generator 410 to recognize variable lengths of the target text. Accordingly, the one or more interfaces 408*a-c* may assist the sequence generator 410 in identifying the target text (or providing predicted characters) based on the expected number text characters for a particular text-field type.

As mentioned, the vector embedding (e.g., vector embedding 418*a*) may be based on the image 402, including the context image data and the target image data. Accordingly, the sequence generator 410 may determine a target text from the vector embedding 418*a* that is based on the context or based on the target text, or a combination thereof. The vector embedding 418*a* may also be based on the target text reoccurring in the image 402, as described in greater detail with respect to FIG. 6.

Sequence generator 410 may determine one or more predicted characters 413*a-c* for the text-field type. The one or more predicted characters 413*a-c* may be alphabetical characters, numeric characters, punctuation characters, symbols, or the like. In some aspects, the sequence generator may determine a plurality of predicted characters (e.g., at least two) for a text-field type. Referring to FIGS. 4-5, the one or more predicted characters 413*a* may be a prediction of the target text 502. Sequence generator 410 may predict '3203.00' as predicted characters 413*a* for an amount due text-field type.

The sequence generator 410 may provide one or more predicted characters 413*a-c* for other text-field types, as illustrated as element numbers 413*b* and 413*c* in FIG. 4. When the instant technology is utilized to analyze a financial document, these text-field types may be a due date text-field type, a vendor name text-field type, an invoice number text-field type, an amount paid text-field type, a contact information text-field type, or other text-field types. It should be appreciated that the text-field types are not limited to financial documents/text. As discussed with reference to FIG. 7, these technologies can be applied to many different types of images of documents or text, including books, forms, legal documents, e-mails, websites, or the like.

Sequence generator 410 may provide a per-character confidence score for determining the one or more predicted characters 413*a-c*. The per-character confidence score for determining the one or more predicted characters may be on a per-character basis. For example, referring to predicted characters 413*a* of '3203.00', the sequence generator 410 may provide a per-character confidence score for each of the individual characters, such as a confidence score for the '3', a confidence score for the '2', a confidence score for the '3', a confidence score for the a confidence score for the '0', and a confidence score for the '0'.

A confidence score may also be determined on a text-field type basis (e.g., text-field type confidence score). The text-field type confidence score may be determined using any predetermined calculation. In some aspects, text-field type confidence score may be determined based on multiplying the per-character confidence score. For example, if the output is '1.99' and if the probability for '1' is 0.99, the probability for '.' is 0.65, the probability for '9' is 0.97, the probability for '9' is 0.95, then the confidence score for the text-field type would be 0.99*0.65*0.97*0.95=0.59. In some aspects, text-field type confidence score may be determined based on an average of the per-character confidence score.

Accordingly, a text-field type confidence score for the amount due text-field type can be determined for predicted characters 413*a* of '3203.00'. The text-field type confidence score provides an indication of how confident the text recognition system 401 is for predicting the combination of the predicted characters (e.g., predicted characters 413*a*) for the text-field type. If the per-character confidence score or the text-field type confidence score satisfy a threshold, the one or more predicted characters 413*a-c* for the text-field type may be provided as relevant text. More specifically, if a character satisfies a particular threshold (e.g., 90%), the predicted character may be provided as relevant text. Similarly, if text-field type confidence score satisfies a particular threshold (e.g., 90%), the string of predicted characters for the text-field type may be provided as relevant text. It should be appreciated that the instant technology has achieved greater accuracy than conventional technology, especially on poor quality images. It is not uncommon that the images analyzed by the text recognition system 401 suffer from image degradation, have a low resolution after being scanned using a camera from a client mobile device, or simply are unclear based on lighting or other conditions when the image was taken. However, the instant technology has achieved a text-field type confidence score as high as 99.9%.

In some aspects, the per-character and/or the text-field type confidence score can be used to determine a page in which a text-field type is located. For example, if an image is of a multi-page document (e.g., an image of a credit card bill), a text-field type may appear on the first page and the third page. The per-character and/or the text-field type confidence score can be used to determine which page the text-field occurs. Additionally or alternatively, if per-character and/or the text-field type confidence scores are different for the text-field occurring on different pages, per-character and/or the text-field type confidence scores can be utilized to determine which predicted characters to provide for that particular text-field type. For instance, the text-field type confidence score or per-character confidence score may be higher on the first page than the third page. This may indicate that the predicted characters for the text field on the first page is more accurate than the predicted characters for the same text field occurring on the third page. It may then be determined that the predicted characters for the text-field type on the first page will be provided as the predicted characters for the text-field type as opposed to the predicted characters on the third page. As such, the instant embodiments can provide predicted characters based the text-field type occurring on different pages of an image of a multi-page document. Conventional technology fails to provide a solution as OCR text for a multi-page document would consume a significant amount of computing resources and complex NLP engines would have to be developed (assuming they could be developed), all of which would consume a greater amount of computing resources than the instant technologies.

The text recognition system 401 may provide relevant text 416*a-c* the particular text-field type. As illustrated, the text recognition system 401 may provide relevant text 416*a* of '3,203.00' for the amount due text-field type. The relevant text 416*a-c* may be associated with text for the text-field type. Example relevant text 416*a-c* may be associated with the text that provides an amount due, a due date, a vendor name, an invoice number, an amount paid, contact information, or the like. The relevant text 416*a-c* may be provided to a computing device, such as client device 302A. The relevant text 416*a-c* may also be consumed via an application or service, such as application 310, or provided for display via a graphical user interface.

The application or service may be any application that utilizes the one or more predicted characters for the text-field type. As described below, the application may be a graphical user interface to verify the extracted data, an electronic billing system (e.g., where the extracted data may be used to store an indication that an invoice should be paid), or a virtual assistant (e.g., to remind the user to take action related to an upcoming deadline to pay an invoice).

In some aspects, the application may include a graphical user interface that causes the extracted data to be presented on a display of a computing device. The graphical user interface may include a summary window of the extracted data or a preview of the image submitted to the text recognition system 401. In some aspects, both the summary window and a preview of the image are output for simultaneous display on the computing device.

The graphical user interface can facilitate a quick summary of the predicted characters for the text-field type. For instance, the graphical user interface may comprise one or more visible indicia that indicates a location within the image from which the target text was extracted. The one or more visible indicia may be any visual indicator, including shapes, symbols, highlighting, text (e.g., numeric text), or other visual indicators. For example, the one or more visible indicia may be an arrow having an origin beginning in the summary window, proximate the one or more predicted characters. The arrow may have an arrow head that terminates in the image, at a location proximate to where the target text was extracted from the image. As mentioned, the one or more visible indicia may also be a shape (e.g., rectangle) that indicates the location of the target text in the image 402.

In some aspects, the application may include an electronic billing system. The electronic billing system may provide an electronic inventory of past financial documents. Additionally, the electronic billing system may allow for automatic payment of an invoice. As such, application may assist in a user managing or triggering future transactions based on the target text.

In some aspects, the application may include a virtual assistant. For example, the virtual assistant may provide alerts or reminders regarding important dates contained in the image. In some aspects, the virtual assistant may schedule a calendar reminder for a due date of an invoice. Additionally, the virtual assistant may provide audio feedback of relevant portions of an image as opposed to having the entire text of the image read aloud, which may be highly beneficial to a visually impaired user to identify the most relevant content quickly and easily.

FIG. 6 is an example illustration of an image 600 having blurred text and reoccurring text, in accordance with aspects described herein. Text recognition system 401 may analyze image 600 and account for blurred text 608 in predicting the predicted characters (e.g., predicted characters 413*a-c*) for a text-field type. As mentioned, the text recognition system 401 can accurately predict characters despite images having a poor image quality. In some aspects, text recognition system 401 may determine one or more predicted characters based on text (or a text-field type) reoccurring within the image. In some aspects, target text or a particular text-field type may reoccur within the image. The reoccurring target text or text-field type may occur in any portion of the image. The reoccurring text or text-field type may occur on different pages of a multi-page document that is captured by the image. Additionally, the location of the reoccurring text-field type may vary for any given image.

Image 600 depicts text 602, text 606, and blurred text 608, all of which relate to an amount due text-field type. Image 600 can be received by the text recognition system 401 so as to determine one or more predicted characters for text 602, text 606, or blurred text 608 (or, more generally, one or more predicted characters for the amount due text field). FIG. 6 illustrates blurred text 608 as being '156.00' because a photographic view 610 of blurred text 608 reveals that the '4' of '456.00' is blurred as to appear like a '1'. FIG. 6 illustrates text 602 and text 606 as being '456.00'. For example, the photographic view 612 of text 602 illustrates text 602 as more clearly depicting a '4' in '456.00'.

Encoder 404 of text recognition system 401 may generate a vector embedding (e.g. vector embedding 418*a*) for the reoccurring text of a particular text-field type. For instance, the vector embedding may be based on the blurred text 608, text 602, and text 606. The vector embedding may be provided to the interface 408*a* or sequence generator 410, as described in greater detail with respect to FIG. 4. The sequence generator 410 may decode the vector embedding and determine one or more predicted characters for an amount due text-field type. Without reoccurring text or reoccurring text-field types, sequence generator 410 might have determined that the predicted characters would be '156.00' based on the blurred text 608. However, the sequence generator 410 may utilize one or more predicted characters for a reoccurring text-field type to improve the accuracy of the prediction.

For instance, the sequence generator 410 may determine that the '1' in the predicted characters of '156.00' has a low per-character confidence score based on predicting a '4' for text 602 and text 606. Similarly, the sequence generator 410 may determine that the combination of the predicted characters '156.00' for the amount due text-field type has a low confidence score based on one or more instances of predicting characters '456.00' for the amount due text-field type. The sequence generator 410 may then provide '456.00' as the predicted characters based on either the per-character confidence score or text-field type confidence score, or both.

As discussed in greater detail with respect to FIG. 4, the image 600 may include shading 604 and bounding box 616. These may be examples of context image data that are utilized by an encoder 404 and sequence generator 410 to recognize patterns so as to identify the target text.

FIG. 7 is an example image 700 of a page from a book. As explained herein, the underlying improvement to technology may be applied to images other than financial documents. FIG. 7 represents how the present technologies can be applied to identifying text-field types in many different images of text or images of documents having text. As illustrated, image 700 is of chapter 132 of the American classic Moby Dick by Herman Melville.

Image 700 may be provided to text recognition system 401 of FIG. 4. The text-field type may include a chapter number text-field type and a chapter title text-field type. The chapter number text-field type may indicate what chapter number is provided by image 700. The chapter title text-field type may indicate what chapter title is provided by image 700.

Text recognition system 401 can utilize encoder 404 to generate a vector embedding (e.g., vector embeddings 418a-c) of image 700 for a particular text-field type. The vector embedding may be provided to the interface 408a or sequence generator 410, or both.

The encoder 404 may generate a vector embedding for a chapter number text-field type. The encoder 404 may generate a vector embedding based on learned patterns or characteristics for a chapter number text-field type. The vector embedding may be based on the target text 702 and context image data. The context image data may include a period 712, text 714 ('CHAPTER'), shape 716 (e.g., a line), spacing 718, text 720 above the target text 702, text 722 below the target text 702, or other similar visual characteristics provided by the image. A set of characters may constrain the sequence generator 410 in decoding a vector embedding for the chapter number text-field type, such as characters for roman numerals (e.g., I, V, X, L, C, D, M, or the like). The sequence generator 410 may then predict characters 'CXXXII', which may be provided as relevant text.

Similarly, the encoder 404 may generate a vector embedding for a chapter title text-field type. The encoder 404 may generate a vector embedding based on learned patterns or characteristics for a chapter title text-field type. The vector embedding may be based on the target text 704 and context image data. It should be appreciated that the vector embedding for the chapter text field may be different than the vector embedding for the chapter title text field as the text recognition system 401 may learn unique patterns for specific text-field types. A set of characters, such as alphabetical, numerical, and punctuation characters, may constrain the sequence generator 410 in decoding the vector embedding for the chapter title text-field type. The sequence generator 410 may then predict characters 'The Symphony', which may be provided as relevant text.

In some aspects, the vector embedding generated for the chapter title text field may be provided to an interface, such as interface 408a. The interface may generate a tensor that is utilized by the sequence generator 410 in identifying the target text or predicting characters for the chapter title text field. While the chapter title 'The Symphony' may be considered a short string of text characters (e.g., 13 text characters, which includes the space as a character and an end character to represent the end of the sequence), there may be instances where the chapter title is longer. For example, the title of chapter 120 of Moby Dick is 'The Deck Towards the End of the First Night Watch', which may be considered a long string of text characters (e.g., 50 text characters). Accordingly, an interface may be employed to assist the sequence generator 410 in detecting target text for the chapter title text-field type or predicting characters for the target text.

Figure 8:
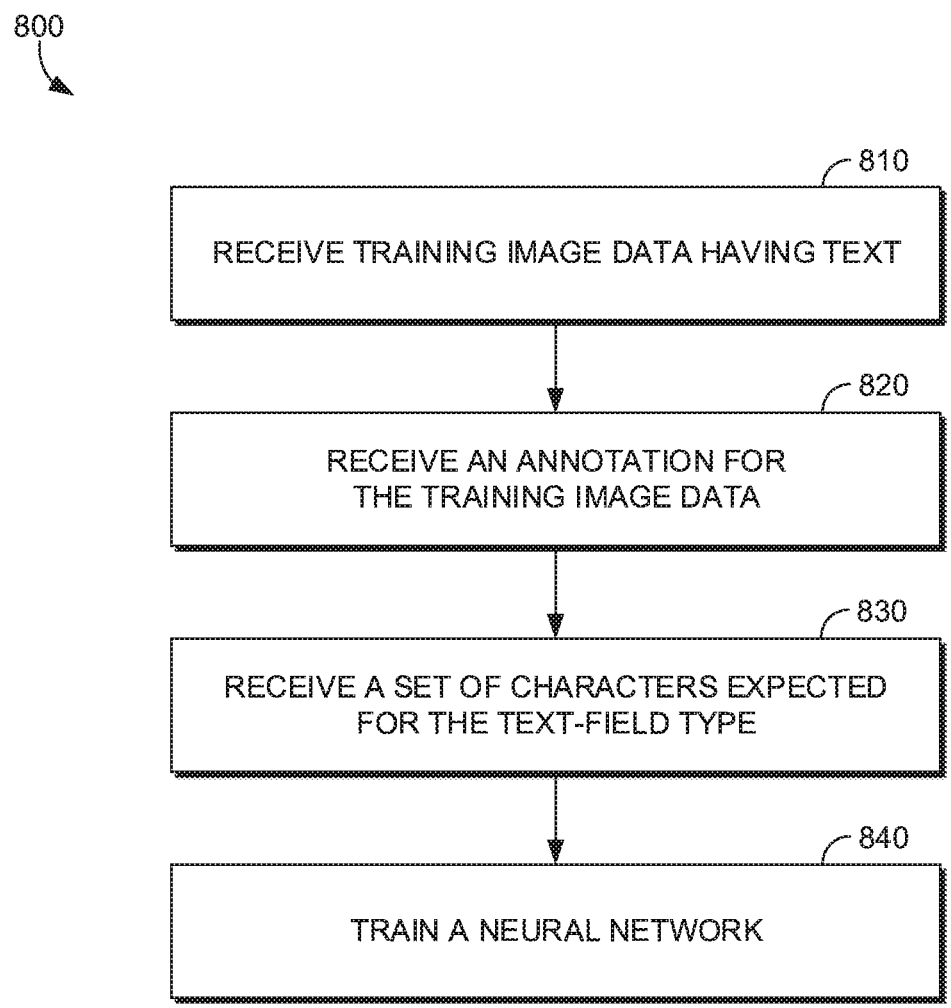
FIG. 8 is a flow diagram illustrating an example method for training the neural network of FIG. 4, in accordance with aspects described herein.

Referring to FIG. 8, a flow diagram is provided illustrating an overview of an example process flow 800 for training a text recognition system, such as text recognition system 401. Process flow 800 can be used, for instance, to train a text recognition system, such as text recognition system 401. At block 810, training image data comprising text is received. The training image data may include target image data and context image data. The context image data may provide a context for the target image data. The training image data may include images of text associated with different text-field types, similar to the text-field types described herein.

In some aspects, the training image data may be high-resolution image data (e.g., 850×1100 pixels). Training the text recognition system on high-resolution image data may improve accuracy and performance of the text recognition system. To conserve computing resources during training, an encoder or sequence generator may be single channel neural networks that processes the image in a grey scale.

In some aspects, the text recognition system may utilize a pre-trained encoder having three channels that is reduced to a single channel. For instance, the encoder, such as encoder 404, may have been reduced from three channels that process images in color (e.g., a channel for each of the colors red, yellow, and blue) to one channel that processes images in a grey scale.

The number of channels of a pre-trained encoder can be reduced to a different number of channels (e.g., a single channel) by averaging each filters' parameters associated with the number of components. The component may be a per-filter, per-component of the filter (e.g., 3×3 filters). This may provide a pre-seed for the weights of the reduced channel encoder.

By way of example, a first layer of a three channel encoder might include 32 3×3 filters with no bias. As such, an input for a three channel encoder would be 864 parameters (e.g., 32*3*9=864). A first layer of a single channel encoder might include 32 1×3 filters. As such, the number of parameters for an input for a single channel encoder would be 288 (e.g., 32*1*9=288). To modify the three-channel encoder to a single channel encoder, the parameters of each filters associated with the nine components can be averaged. Reducing the number of channels will reduce the number of parameters (e.g., 864 as compared to 288), which may conserve computing resources. This is especially true when the first layer of the encoder may generate convolutions on high-resolution images (e.g., 850×1100 pixels).

In some aspects, the image recognition system may be trained based on substantially all of the image. Alternatively, the image recognition system may be trained on substantially all of the document or text associated with the image. It is contemplated that "substantially all" may refer to 100%, at least 95%, at least 90%, or at least 80% of the image submitted by the client device. It is also contemplated "substantially all" of a document or text associated with an image may refer to 100%, at least 95%, at least 90%, or at least 80% of a document or text associated with an image. It should be appreciated that because the technologies described herein conserve computing resources, the text recognition system can be trained on substantially all the image, substantially all of the portions of the image having the document, or substantially all of the portions of the image having text.

At block 820, an annotation for the training image data may be received. The annotation may be a predicted outcome at which the text recognition system should arrive based on the training image data. The annotation may be for a text associated with the text-field type, such as target text. In some aspects, the annotation provides an indication of the training target text associated with the target image data. For example, if the text recognition system was trained on image 500 of FIG. 5, the annotation may be '3203.00'. The annotation may be provided as a textual input (e.g., as part of CSV file) that is provided to encoder 404 and the sequence generator 410. The annotation may be provided as a visual annotation of the image, such as a bounding box. In some aspects, the encoder (e.g., encoder 404) and sequence generator (sequence generator 410) are trained end-to-end. In aspects utilizing the encoder (e.g., encoder 404), an interface (interface 408a), and sequence generator (sequence generator 410), the encoder, interface, and sequence generator may be trained end-to-end. As described herein, the encoder, interface, and sequence generator may be trained for a particular text-field type.

At block 830, a set of characters that are expected for the text-field type is received. In some aspects, the set of characters constrain a neural network. The set of characters may be specific to a particular text-field type. For instance, a first set of characters may be associated with a first text-field type, while a second set of characters may be associated with a second text-field type. During training, one or more layers of the text recognition system (e.g., the one or more neural network layers 406a-c of the encoder 404) is trained to generate a vector embedding based on the context image data and the target image data using the set of characters. Similarly, the sequence generator (e.g., one or more layers 412a-c of the sequence generator 410) is trained to decode the vector embedding to predict one or more characters for the target text based on the set of characters.

The set of characters may include one or more characters that are expected for the text-field type. The set of characters may include any set of alphabetical characters (e.g., A-Z), numerical characters (e.g., 0-9), punctuation (e.g., a comma, period, or hyphen), symbols, or the like. In some aspects, the set of characters used to be a dictionary of characters used to transform target text associated with the text-field type to a one-hot encoding character level representation. It should be appreciated that the set of characters provides a per-character prediction for any given target text.

At block 840, the neural network is trained. The neural network is trained using the training image data, the annotation for the training image data, and the set of characters expected for the text-field type. As described herein, the encoder and sequence generator may be trained end-to-end for a specific text-field type. In some aspects, the encoder, interface, and the sequence generator is trained end-to-end. The trained neural network may identify new target text associated with the text-field type within new image data. In some aspects, the new image data is of a new document or new text. As described herein, the trained neural network may identify the new target text from a vector embedding that is based a new context provided by new context image data. The trained neural network may predict characters for the particular text-field type based on the vector embedding. The trained neural network may provide the predicted characters to a consumer application, as described in greater detail with respect to FIG. 4.

Figure 9:
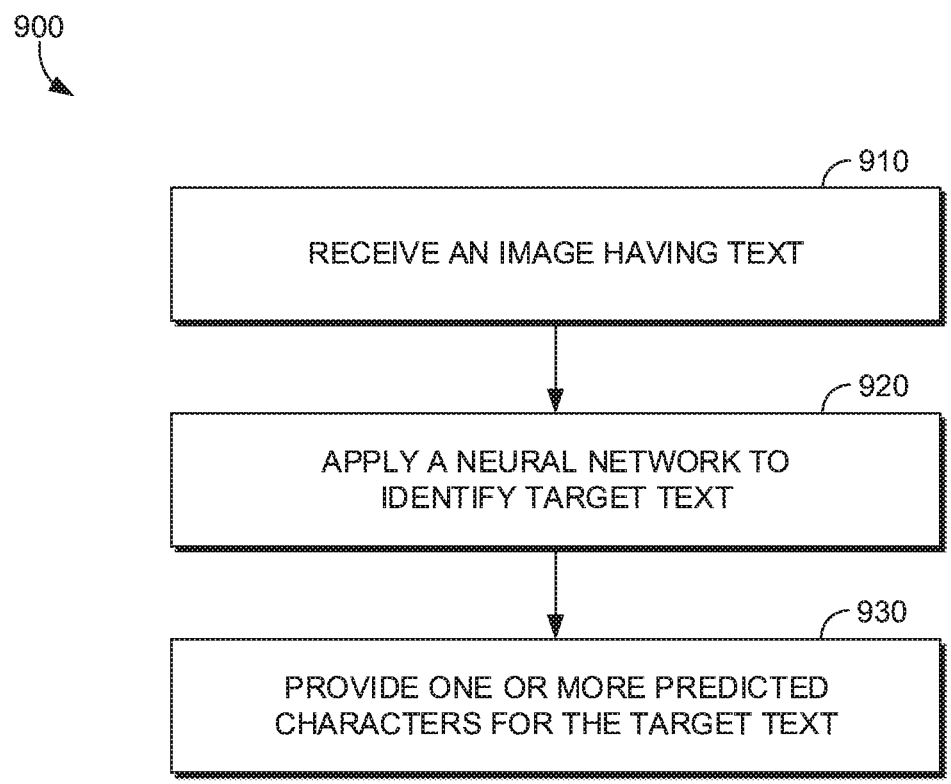
FIG. 9 is a flow diagram illustrating an example method for applying the neural network of FIG. 4 to provide one or more predicted characters from an image having text, in accordance with aspects described herein.

Referring to FIG. 9, a flow diagram is provided illustrating an overview of an example process flow 900 for utilizing a trained neural network as a text recognition system, such as text recognition system 401 of FIG. 4. At block 910, image data having text is received at the text recognition system. The text may be associated with one or more text-field types. The image data may include target image data and context image data. The target image data includes target text associated with a particular text-field type. The context image data may provide a context for the target text or the target image data.

At block 920, a trained neural network is applied to the image data. The trained neural network may be constrained to a set of characters for the particular text-field type. The trained neural network may identify the target text of the particular text-field type. For instance, the neural network may identify the target text based on the context provided by the context image data, as described in greater detail with respect to FIG. 4. For instance, the context image data may provide images of text, shapes, spacing, symbols, or the like, that allows an encoder (such as encoder 404) and a sequence generator (such as sequence generator 410) to determine the target text for a text-field type. The encoder may be a single channel encoder. It should be appreciated that the neural network may also identify the target text based on the text-field type (or the target text) reoccurring within the image.

In some aspects, the text recognition system utilizes an interface, such as interface 408a. The interface generally allows the sequence generator 410 to process text-field types having variable lengths. In some aspects, the interface is based on a maximum number of characters for a text-field type. The maximum number of characters may be a fixed length of characters even though the number of characters that appear for a text-field type may be less than the maximum number of characters. In some instances, the interface may facilitate processing text-field types having a particular length (or number) of text characters. For example, the interface may allow the sequence generator 410 to accurately predict one or more characters for target text having at least twenty text characters. The interface may be utilized for text-field types having a particular number of anticipated text characters. In some aspects, the interface may be utilized for text-field types that are expected to have at least twenty text characters, at least thirty text characters, or at least forty text characters.

At block, 930, one or more predicted characters, such as one or more predicted characters 413*a-c* of FIG. 4, are provided for the target text of the particular text-field type in response to identifying the target text of the particular text-field type using the trained neural network. The one or more predicted characters may be provided based on either the per-character confidence score or text-field type confidence score, or both, as described in greater detail with respect to FIG. 4.

Example Operating Environment

Figure 10:
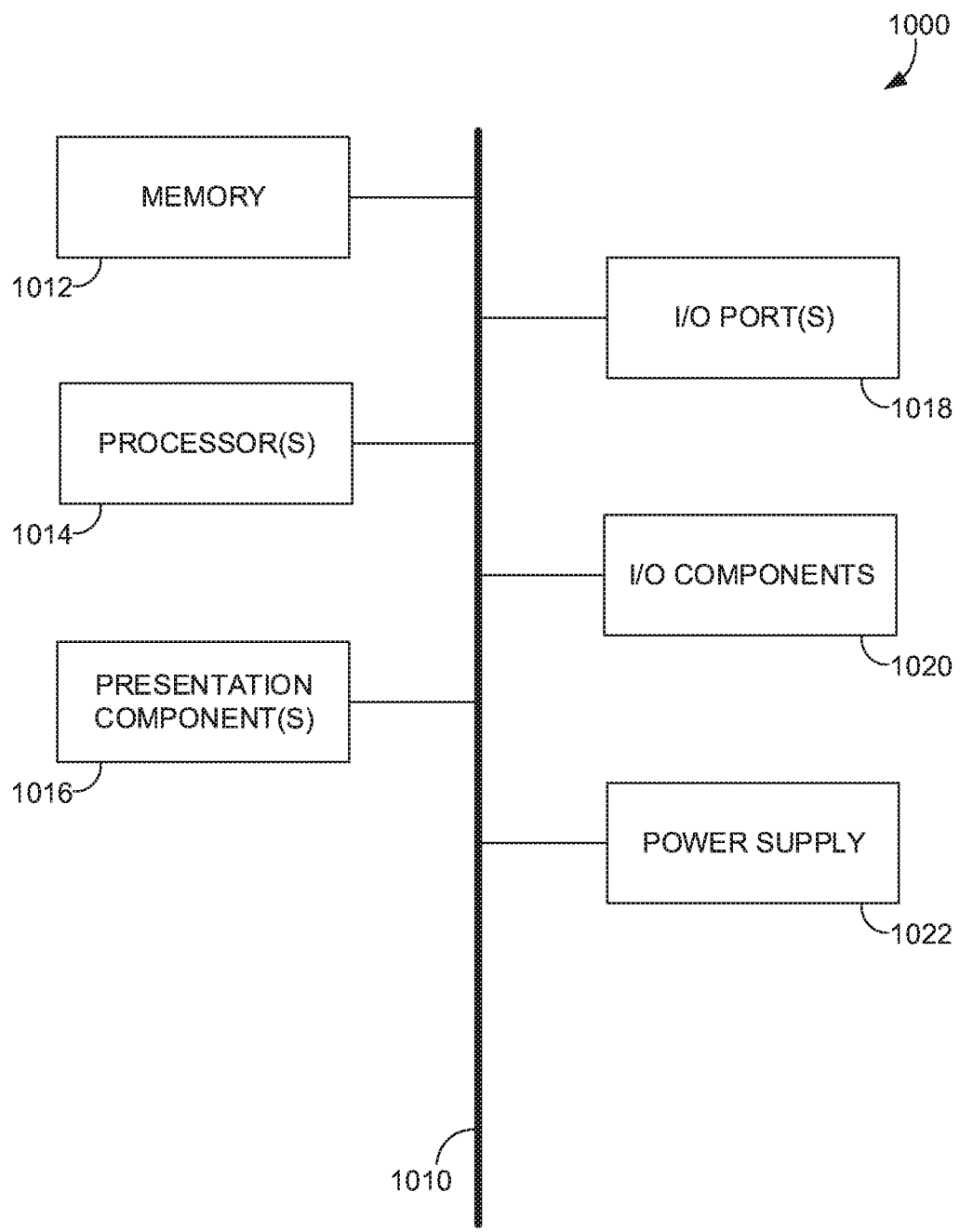
FIG. 10 is a block diagram of an example computing environment suitable for use in implementing aspects described herein.

Having described an overview of the technology, along with various examples, an exemplary operating environment in which embodiments of the technology may be implemented is described below in order to provide a general context for various embodiments. Referring now to FIG. 10 in particular, an exemplary operating environment for implementing embodiments of the technology is shown and designated generally as computing device 1000. Computing device 1000 is but one example of a suitable computing environment and is not intended to suggest any limitation as to the scope of use or functionality of the technology. Neither should computing device 1000 be interpreted as having any dependency or requirement relating to any one or combination of components illustrated.

A further example of a suitable operating environment may include one or more virtual instances. For example, computing device 1000 may be a "host" for one or more virtual instances. In some embodiments, the one or more virtual instances may be a virtual machine (VM). A VM may be a virtual representation of a physical computer (e.g., CPU, memory, or the like). Each virtual machine may utilize its own operating system and application(s). A virtual machine may operate on a layer of software of a host computer. The layer of software may include a virtual machine monitor (e.g., a "hypervisor") that allocates resources of the host computer to the virtual machine(s). In some embodiments, the one or more virtual instances may be a container. A container may be virtual representation of the application layer that packages code and dependencies together. A container may share an operating system kernel with other containers. Containers may operate on a runtime engine (e.g., Docker runtime engine) of a host computer. It should be appreciated that a single physical computer may provide multiple virtual machines or multiple containers. Computing device 1000 may therefore provide a plurality of virtual instances, where each virtual instance can provide an operating environment for the technology described herein.

The technology may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 10, computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 10 is merely illustrative of an exemplary computing device that can be used in connection with one or more embodiments. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile or nonvolatile memory. The memory may be removable, non-removable, or a combination thereof. Example hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1000. Computing device 1000 may be equipped with depth cameras, such as stereoscopic camera systems, infrared camera systems, RGB camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of computing device 1000 to render immersive augmented reality or virtual reality.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the words "including" and "having" have the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however the distributed computing environment depicted herein is merely an example. Components can be configured for performing novel aspects of embodiments, where the term "configured for" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages which are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

What is claimed is:

1. One or more computer storage media having computer-useable instructions that, when used by one or more computing devices, cause the one or more computing devices to perform operations of utilizing a trained neural network as a text recognition system, the operations comprising:
   receiving, at the trained neural network, image data having text associated with a plurality of text-field types, the image data including target image data and context image data, the target image data including target text associated with a text-field type, the context image data providing a context for the target image data, the target image data including visual characteristics data, the visual characteristics data including one or more of: font size of the target text, color of the target text, and a format of the target text, wherein the context image data including one or more of: content surrounding the target text, font size of the content surrounding the target text, color of the content around the target text, a location of the target text relative to a location of the content, and spacing between the content and the target text;
   applying, to the image data, the trained neural network, the trained neural network identifying the target text of the text-field type using a vector embedding that is based on learned patterns for recognizing the visual characteristics data and the context provided by the context image data; and
   based at least in part on the learned patterns for recognizing the visual characteristics data and the context, providing one or more predicted characters for the target text of the text-field type in response to identifying the target text using the trained neural network.

2. The computer storage media of claim 1, wherein the operations further comprising, determining that the target text is reoccurring in the image data, and wherein the providing one or more predicted characters for the target text of the text-field type is based on the determining that the target text is reoccurring.

3. The computer storage media of claim 1, wherein the target text is an amount due.

4. The computer storage media of claim 1, wherein the context image data includes a bounding box around the target text, shading around the target text, and a location of the target text in relationship to the location of other text.

5. The computer storage media of claim 1, wherein the trained neural network includes a convolution neural network that is trained end-to-end with a recurrent neural network (RNN).

6. The computer storage media of claim 5, wherein the trained neural network includes an interface that facilitates the RNN processing a particular number of text characters for the text-field type.

7. The computer storage media of claim 1, wherein the image data includes a financial document of at least one of: a bill, invoice, receipt, or purchase order.

8. One or more computer storage media devices having computer-useable instructions that, when used by one or more computing devices, cause the one or more computing devices to perform operations of training a neural network to identify relevant portions of text within an image, the operations comprising:
receiving training images comprising training image data having text, the training image data including target image data and context image data, the target image data including target text associated with a text-field type, the context image data providing a context for the target text, the target image data including visual characteristics data, the visual characteristics data including one or more of: font size of the target text, color of the target text, and a format of the target text, wherein the context image data including one or more of: content surrounding the target text, font size of the content surrounding the target text, color of the content around the target text, a location of the target text relative to a location of the content, and spacing between the content and the target text;
receiving an annotation for the training image data, the annotation visually indicating the target text captured by the target image data; and
training a neural network to learn patterns for recognizing the context provided by the context image data based at least in part on the training image data, the annotation for the training image data, and the visual characteristics data, wherein the trained neural network identifies new target text associated with the text-field type, the new target text identified based on using the learned patterns to generate a vector embedding of new image data, the new image data including new target image data and new context image data providing a new context for the target image data, and wherein the trained neural network provides one or more predicted characters for the new target text of the text-field type.

9. The one or more computer storage media devices of claim 8, wherein the trained neural network identifies the target text of the text-field type based on the target text reoccurring in the image data.

10. The one or more computer storage media devices of claim 8, wherein the trained neural network identifies the target text of the text-field type based on a relationship between text of the context image data and the target text.

11. The one or more computer storage media devices of claim 8, wherein the context provided by the context image data includes at least one of an alpha-numeric character, a symbol, or a punctuation mark.

12. The one or more computer storage media devices of claim 8, wherein the trained neural network includes a convolution neural network that is trained end-to-end with a recurrent neural network (RNN).

13. The one or more computer storage media devices of claim 12, wherein the trained neural network includes an interface that facilitates the RNN processing a particular number of text characters for the text-field type.

14. The one or more computer storage media devices of claim 8, wherein the one or more predicted characters includes at least two characters from the set of characters that constrain the neural network.

15. A computer-implemented method comprising:
receiving, at a trained neural network, an image comprising image data having text associated with a text-field type, the image data including target image data and context image data, the target image data including target text associated with the text-field type, the context image data providing a relationship between the target text and a remaining portion of the image data, the target image data including visual characteristics data, the visual characteristics data including one or more of: font size of the target text, color of the target text, and a format of the target text, wherein the context image data including one or more of: content surrounding the target text, font size of the content surrounding the target text, color of the content around the target text, a location of the target text relative to a location of the content, and spacing between the content and the target text; and
based at least in part on the visual characteristics data and the context image data, providing, via the trained neural network, one or more predicted characters for the target text of the text-field type in response to identifying the target text using the trained neural network.

16. The computer-implemented method of claim 15, wherein the trained neural network identifies the target text of the text-field type based on the target text reoccurring in the image data.

17. The computer-implemented method of claim 15, wherein the trained neural network includes a convolution neural network that is trained end-to-end with a recurrent neural network (RNN).

18. The computer-implemented method of claim 17, wherein the trained neural network includes an interface that facilitates the RNN processing a particular number of text characters for the text-field type.

19. The computer-implemented method of claim 15, wherein the trained neural network is a single channel neural network.

20. The computer-implemented method of claim 15, wherein the one or more predicted characters includes at least two characters that constrain the trained neural network.

* * * * *